United States Patent [19]
Kurio et al.

[11] Patent Number: 4,774,918
[45] Date of Patent: Oct. 4, 1988

[54] ENGINE LUBRICATING SYSTEM

[75] Inventors: Noriyuki Kurio; Hiroshi Yoshimi; Takuro Shigemura; Yuuji Shono, all of Hiroshima, Japan

[73] Assignee: Mazda Motor Corporation, Japan

[21] Appl. No.: 6,197

[22] Filed: Jan. 23, 1987

[30] Foreign Application Priority Data

Jan. 24, 1986 [JP] Japan .................................. 61-14098

[51] Int. Cl.⁴ ............................................. F01M 1/00
[52] U.S. Cl. .................................. 123/196 R; 418/84; 418/88
[58] Field of Search ................ 123/196 R, 196 S, 242; 418/88, 84; 184/6.16, 27.2, 33; 417/218, 500

[56] References Cited

U.S. PATENT DOCUMENTS 3,764,234 10/1973 Morgan et al. ................. 184/6.16 X
3,834,844 9/1974 Morgan .............................. 418/88 X

FOREIGN PATENT DOCUMENTS 30651 7/1981 Japan .
6001 1/1985 Japan .
3201 1/1985 Japan .
8100 3/1985 Japan .

Primary Examiner—Stephen F. Husar
Attorney, Agent, or Firm—Gerald J. Ferguson, Jr.

[57] ABSTRACT

An engine lubricating system includes a lubricating oil supply mechanism having a plunger member adapted to be reciprocated in the axial direction in response to an engine output shaft to discharge lubricating oil, a control pin which is adapted to abut against the plunger member and is movable to change the stroke of the plunger member, thereby changing the discharge rate of the plunger member, and an electric actuator which moves the control pin to change the stroke of the plunger member. The engine operating condition is detected by way of at least both the engine load and the engine speed, and an electrical control unit outputs an electric control signal for controlling the electric actuator to change the discharge rate according to the engine operating condition.

11 Claims, 9 Drawing Sheets

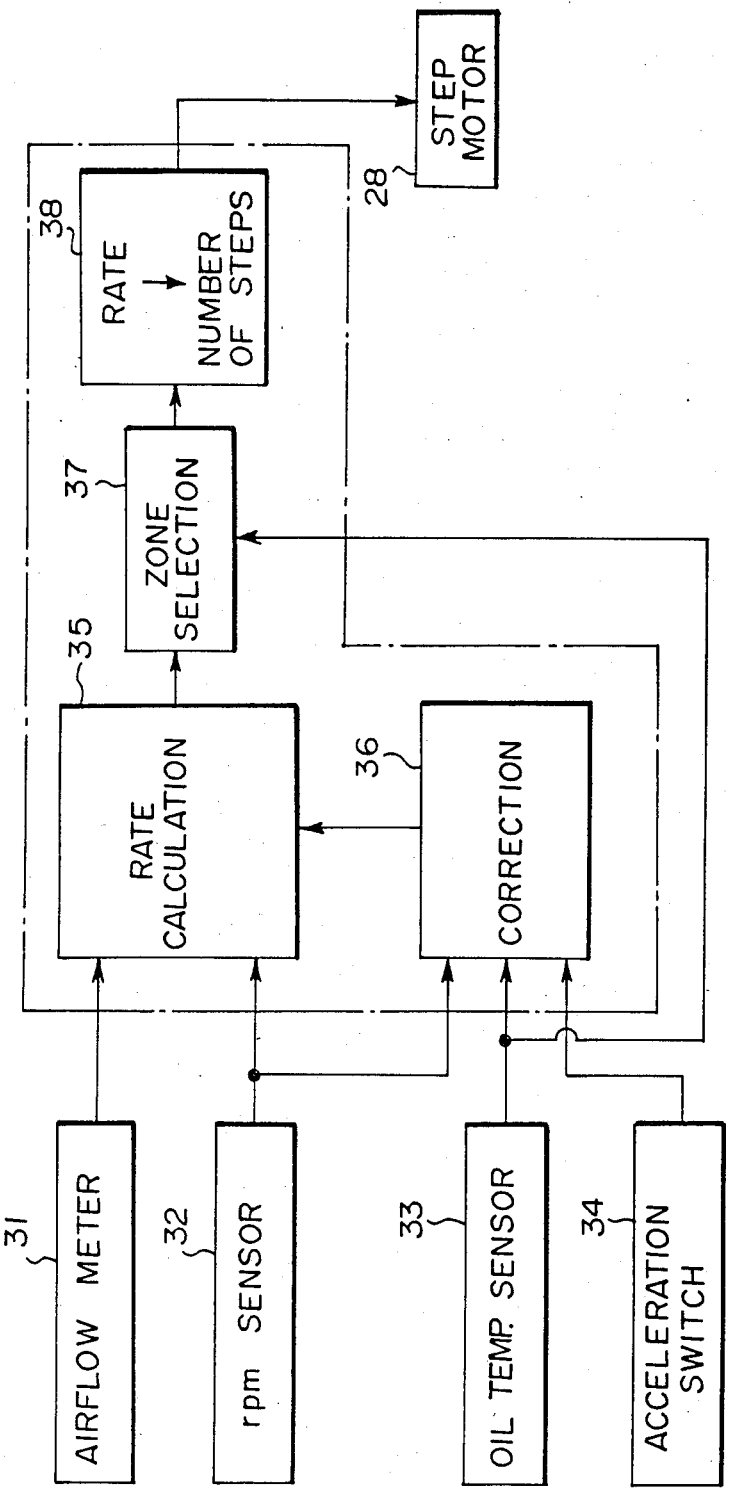
F I G. 6

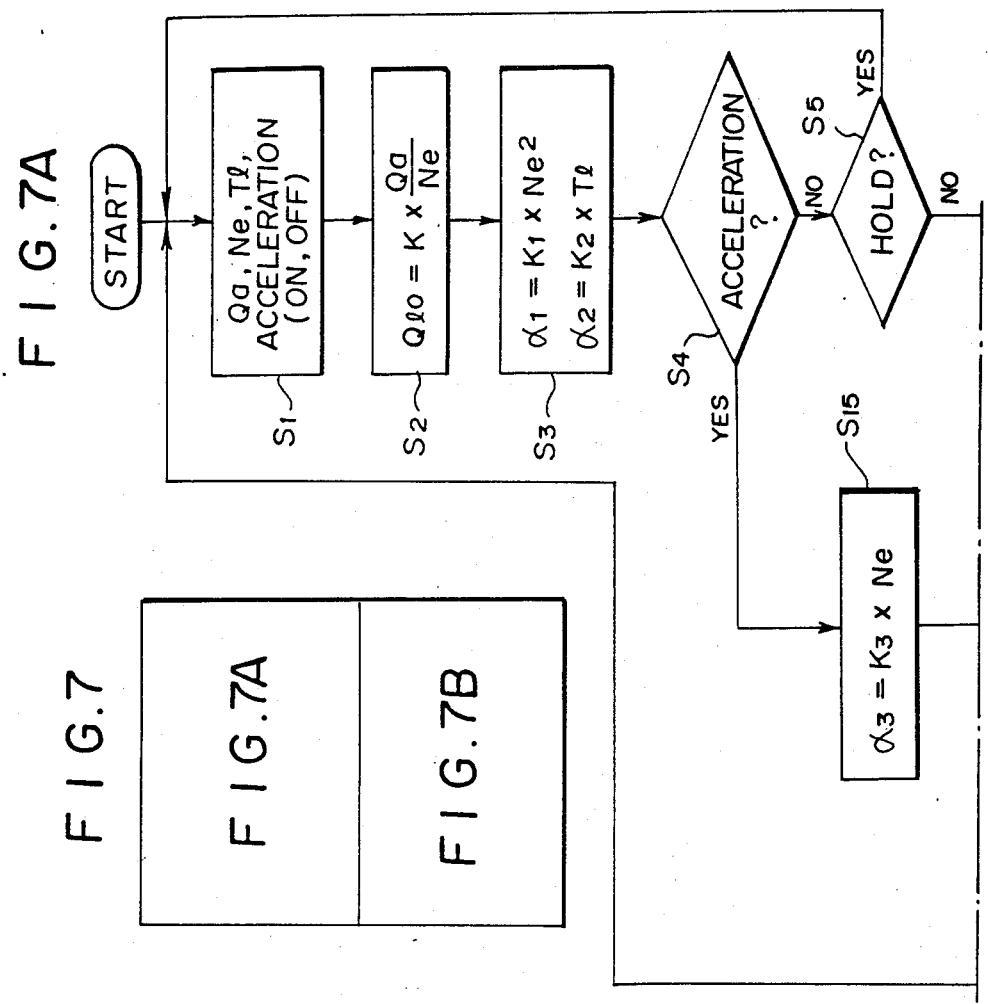

F I G.11
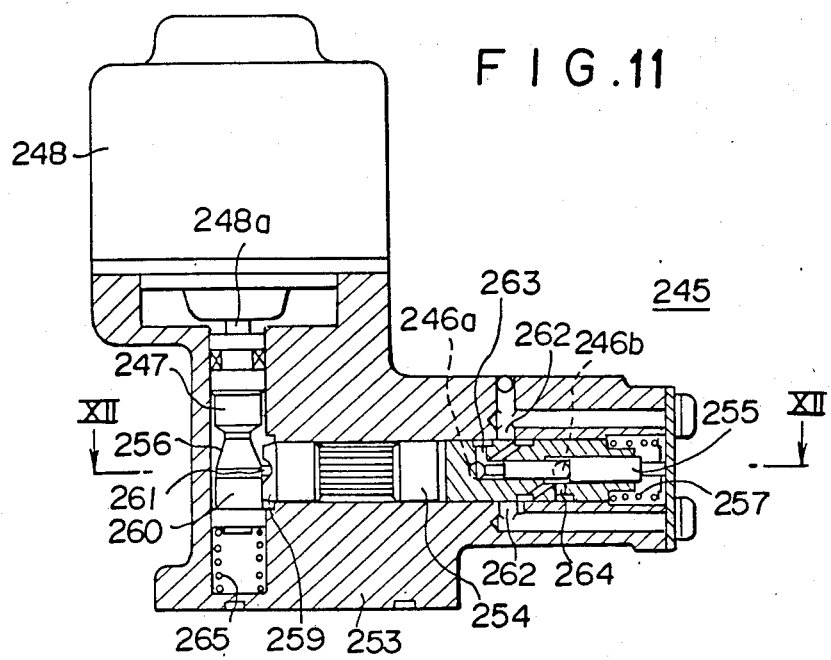
F I G.12
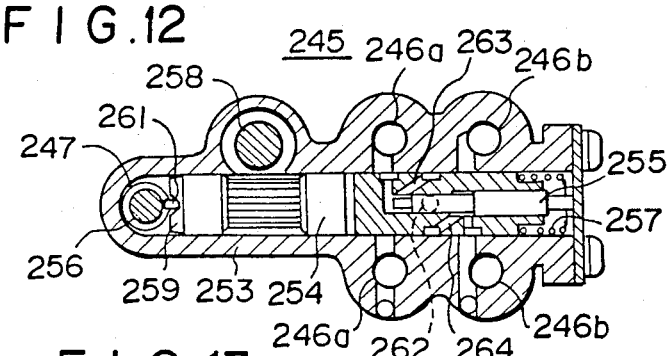
F I G.13
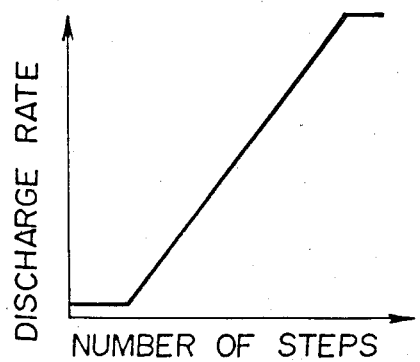

ENGINE LUBRICATING SYSTEM

BACKGROUND OF THE INVENTION

1. Field of the Invention

This invention relates to an engine lubricating system, and more particularly to a system for controlling the amount of lubricant to be supplied to the combustion chamber in a Wankel engine, a two-cycle engine or the like.

2. Description of the Prior Art

As disclosed in Japanese Unexamined patent publication No. 60(1985)-6001 and Japanese Unexamined Utility Model publication No. 60(1985)-3201, for instance, in a Wankel engine or the like, a measured amount of lubricating oil is supplied to the combustion chamber by a metering oil pump to lubricate the moving parts in the housing separately from the main lubricating system. In such a lubricating system, the amount of oil to be supplied to the combustion chamber is controlled by the metering oil pump. That is, the metering oil pump generally discharges lubricating oil in synchronization with engine revolution by way of a plunger driven by the engine output shaft, and the stroke of the plunger is controlled by a cam provided on a control pin which is rotated in response to the throttle valve, thereby controlling the amount of lubricating oil to be discharged from the metering oil pump per unit engine revolution.

In the conventional system, the oil discharge rate of the metering oil pump (the amount of lubricating oil to be discharged from the metering oil pump per unit engine revolution) solely depends upon the engine load (the throttle opening) irrespective of the engine speed. However, the lubricating oil requirement per unit engine revolution also changes with the engine speed. That is, since the temperature of the moving parts rises as the engine speed increases, the lubricating oil requirement increases with increase in the engine speed. Accordingly, if the oil discharge rate of the oil pump is set to meet the lubricating oil requirement at a low engine speed, the amount of lubricating oil will be insufficient during a high speed operation of the engine, and on the other hand, if the oil discharge rate is set to meet the lubricating oil requirement at a high engine speed, the amount of lubricating oil will be excessive during a low speed operation of the engine.

SUMMARY OF THE INVENTION

In view of the foregoing observations and description, the primary object of the present invention is to provide an engine lubricating system in which the proper amount of lubricating oil can be supplied to the combustion chamber irrespective of the engine operating condition.

Another object of the present invention is to provide an engine lubricating system in which the above object can be accomplished with a high accuracy and with a simple structure.

The engine lubricating system in accordance with the present invention comprises a lubricating oil supply means having a plunger member adapted to be reciprocated in the axial direction in response to an engine output shaft to discharge lubricating oil, a control pin which is adapted to abut against the plunger member and is movable to change the stroke of the plunger member, thereby changing the amount of the lubricating oil to be discharged in each stroke of the plunger member, and an electric actuator which moves the control pin to change the stroke of the plunger member;

an operating condition detecting means which detects the engine operating condition by way of at least both the engine load and the engine speed and outputs an electric signal according to the engine operating condition; and a control means which receives the electric signal from the operating condition detecting means and outputs an electric control signal for controlling the electric actuator.

BRIEF DESCRIPTION OF THE DRAWINGS

FIG. 6 is a block diagram schematically showing the arrangement of the control unit, FIGS. 7, 7A and 7B are flow charts showing the control to be made by the control unit, FIG. 11 is a cross-sectional view of still another example of the metering oil pump which can be employed in the engine lubricating system of the present invention, FIG. 12 is a cross-sectional view taken along line XII—XII in FIG. 11, FIG. 13 is a view showing the relation between the discharge rate of the metering oil pump of FIG. 11 and the number of steps of the stepping motor thereof.

DESCRIPTION OF THE PREFERRED EMBODIMENT

Figure 1:
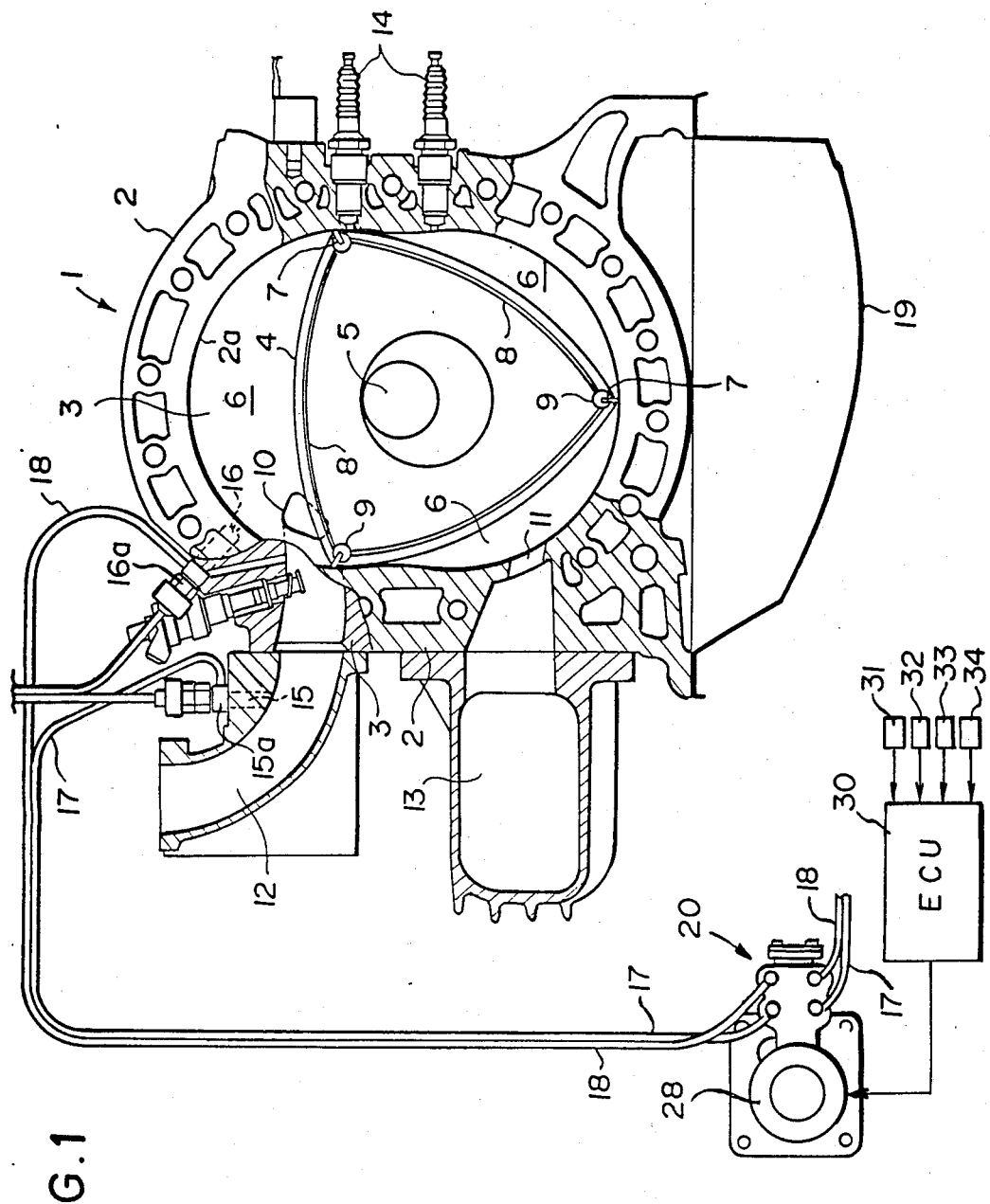
FIG. 1 is a schematic view showing an engine lubricating system in accordance with an embodiment of the present invention.

In FIG. 1, a casing 1 of a Wankel engine comprises a rotor housing 2 having a trochoidal inner surface 2a, and a pair of side housings 3 disposed on opposite sides of the rotor housing 2. A triangular rotor 4 supported on an eccentric shaft 5 rotates in the casing 1, and forms three chambers (combustion chambers) 6 in the casing 1. As the rotor 4 rotates, intake, compression, power and exhaust take place. On each apex of the rotor 4 is mounted an apex seal 7 which is in contact with the inner surface 2a of the rotor housing 2. Further, a side seal 8 is mounted on each side of the rotor 4 to be in contact with the inner surface of the side housing 3, and a pair of corner seals 9 are attached to opposite sides of each apex of the rotor 4.

The casing 1 is provided with an intake port 10 which is communicated with the chamber 6 in intake stroke through the side housing 3 and an exhaust port 11 which is communicated with the chamber 6 in exhaust stroke through the rotor housing 2. An intake passage 12 and an exhaust passage 13 are respectively connected to the intake port 10 and the exhaust port 11. A pair of spark plugs 14 are mounted on the rotor housing 2 in a predetermined position.

A lubricating system for lubricating the parts in the casing 1 on which the apex seals 7 and the like slide includes first and second oil supply passages 17 and 18, and a metering oil pump 20 which measures lubricating oil fed thereto from an oil pan 19 by an oil pump (not shown) and discharges the measured amount of lubricating oil to the oil supply passages 17 and 18. The first oil supply passage 17 opens to the downstream end of the intake passage 12 by way of a first oil supply port 15 to supply the lubricating oil to the chamber 6 by way of the intake passage 12. The second oil supply passage 18 opens in the inner surface 2a of the rotor housing 2 by way of a second oil supply port 16 to directly supply the lubricating oil to the chamber 6. The first and second oil supply ports 15 and 16 are respectively provided with oil supply nozzles 15a and 16a.

The discharge rate of the metering oil pump 20 is controlled by an electrical control unit (ECU) 30. In this particular embodiment, the amount of the lubricating oil to be discharged to the first oil supply passage 17, i.e., the amount of the oil to be introduced into the chamber 6 through the intake passage 12 (This lubrication will be referred to as "port lubrication", hereinbelow.), and the amount of the lubricating oil to be discharged to the second oil supply passage 18, i.e., the amount of the oil to be directly introduced into the chamber 6 (This lubrication will be referred to as "direct lubrication", hereinbelow.) are separately controlled. Signals from an airflow meter 31 for detecting the amount of intake air, an engine speed sensor 32 for detecting the engine rpm, an oil temperature sensor 33 for detecting the temperature of the lubricating oil, and an acceleration switch 34 for detecting acceleration of the engine are input into the control unit 30. The control unit 30 detects the amount of intake air introduced into the chamber 6 per one engine revolution (This will be sometimes referred to simply as "intake volume", hereinbelow.) by way of the signals from the airflow meter 31 and the engine speed sensor 32.

Figure 2:
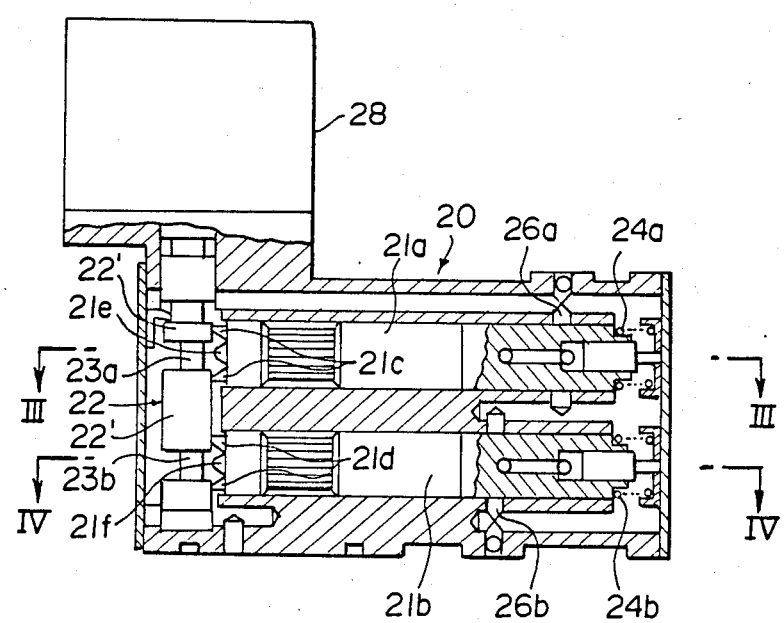
FIG. 2 is a cross-sectional view of the metering oil pump employed in the engine lubricating system.
Figure 3:
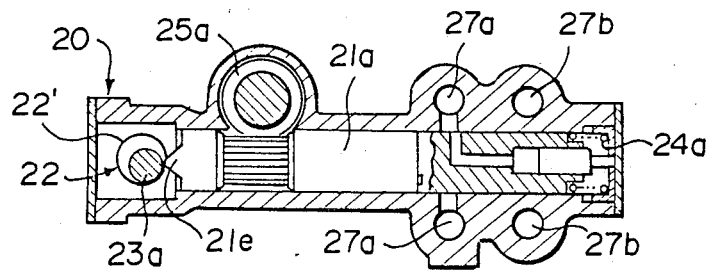
FIG. 3 is a cross-sectional view taken along line III—III in FIG. 2.
Figure 4:
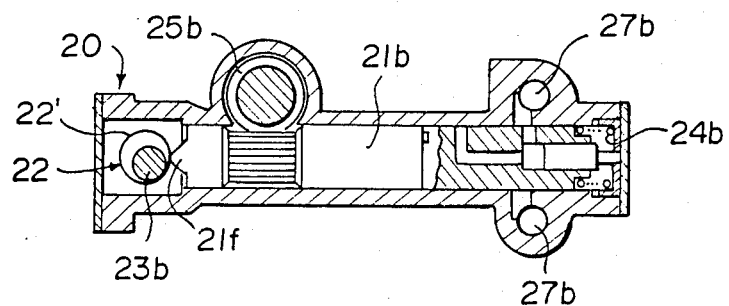
FIG. 4 is a cross-sectional view taken along line IV—IV in FIG. 2.

As shown in detail in FIGS. 2 to 4, the metering oil pump 20 comprises first and second plungers 21a and 21b respectively for the port lubrication and the direct lubrication, and a control pin 22 having first and second cams 23a and 23b respectively for controlling the strokes of the first and second plungers 21a and 21b.

The plungers 21a and 21b are driven to rotate by driving worms 25a and 25b while being urged toward the control pin 22 by springs 24a and 24b. The driving worms 25a and 25b are rotated in synchronization with the engine output shaft. A pair of projections 21c are provided, diametrically opposed to each other, on the end face of the first plunger 21a remote from the spring 24a, and a central projection 21e is provided between the projections 21c on the same end face of the first plunger 21a. Similarly, a pair of projections 21d are provided, diametrically opposed to each other, on the end face of the second plunger 21b remote from the spring 24b, and a central projection 21f is provided between the projections 21d on the same end face of the second plunger 21b. As each plunger is rotated, the diametrically opposed projections are engaged with large diameter base portions 22' (circular in shape) of the control pin 22 and disengaged therefrom depending on the angular position thereof, and when the diametrically opposed projections are disengaged from the large diameter base portions 22', the central projection is moved toward the control pin 22 to abut against the cam under the force of the spring, whereby the plunger is reciprocated. By the rotation and the reciprocating motion of the plungers 21a and 21b, the lubricating oil is taken through inlets 26a and 26b and discharged through outlets 27a and 27b alternately in synchronization with engine revolution. Though only one cylinder is shown in FIG. 1, the engine lubricating system of this embodiment is for lubricating a pair of cylinders and accordingly a pair of first outlets 27a and a pair of second outlets 27b are provided. Each of the first outlets 27a for the first plunger 21a is connected to the first oil supply passage 17 for one of the cylinders and each of the second outlets 27b for the second plunger 21b is connected to the second oil supply passage 18 for one of the cylinders.

The control pin 22 is driven by a stepping motor 28. The stepping motor 28 receives pulse signals output from the control unit 30 and rotates the control pin 22 by one step (a predetermined angle) for each pulse.

In the metering oil pump 20, displacement of the cams 23a and 23b due to rotation of the control pin 22 changes the stroke of the plungers 21a and 21b, thereby changing the discharge rate by the plungers 21a and 21b. The discharge rate can be electrically controlled by way of the stepping motor 28. Further, the discharge rate changing characteristics can be separately set for the first plunger 21a (port lubrication) and the second plunger 21b (direct lubrication) by selecting the shapes of the first and second cams 23a and 23b. That is, when the shape of the first cam 23a differs from that of the second cam 23b, the discharge rate by the first plunger 21a and that by the second plunger 21b for a given angular position of the control pin 22 differ from each other, and the ratio of the former discharge rate to the latter discharge rate is changed according to the angular position of the control pin 22. In this particular embodiment, the change in the discharge rate by the first plunger 21a (port lubrication) is related to the number of steps of the stepping motor 28 (the angular position of the control pin 22) as shown by broken lines $X_1$ to $X_4$ in FIG. 5, and the change in the discharge rate by the second plunger 21b (direct lubrication) is related to the number of steps of the stepping motor 28 (the angular position of the control pin 22) as shown by solid lines $Y_1$ to $Y_4$ in FIG. 5.

That is, in A zone in which the number of steps N of the stepping motor 28 is smaller than a first preset value a, the discharge rate for the direct lubrication is fixed to a maximum value f ($Y_1$) while the discharge rate for the port lubrication is linearly changed from a predetermined value g to a minimum value e with change in the number of steps N ($X_1$). In B zone in which the number of steps N is not smaller than the first preset value a and smaller than a second preset value b, the discharge rate for the port lubrication is fixed to the minimum value e ($X_2$) while the discharge rate for the direct lubrication is linearly changed from the maximum value f to the minimum value e with change in the number of steps N ($Y_2$). In C zone in which the number of steps N is not smaller than the second preset value b and smaller than a third preset value c, the discharge rate for the direct lubrication is fixed to the minimum value e ($Y_3$) while the discharge rate for the port lubrication is linearly changed from the minimum value e to a maximum value h with change in the number of steps N ($X_3$). In D zone in which the number of steps is not smaller than the third preset value c and smaller than a fourth preset value d, the discharge rate for the port lubrication is fixed to the maximum value h ($X_4$) while the discharge rate for the direct lubrication is linearly changed from the minimum value e to the maximum value f ($Y_4$). If an excessive amount of oil is directly supplied to the chamber 6, the lubricating oil can reach the spark plugs 14 along the inner surface 2a of the rotor housing 2 without being sufficiently dispersed, thereby adversely affecting ignition performance of the spark plugs 14. Accordingly, the maximum value f of the discharge rate for the direct lubrication should be determined so as not to cause such a problem. Further, the minimum value e may be zero or substantially zero.

Figure 5:
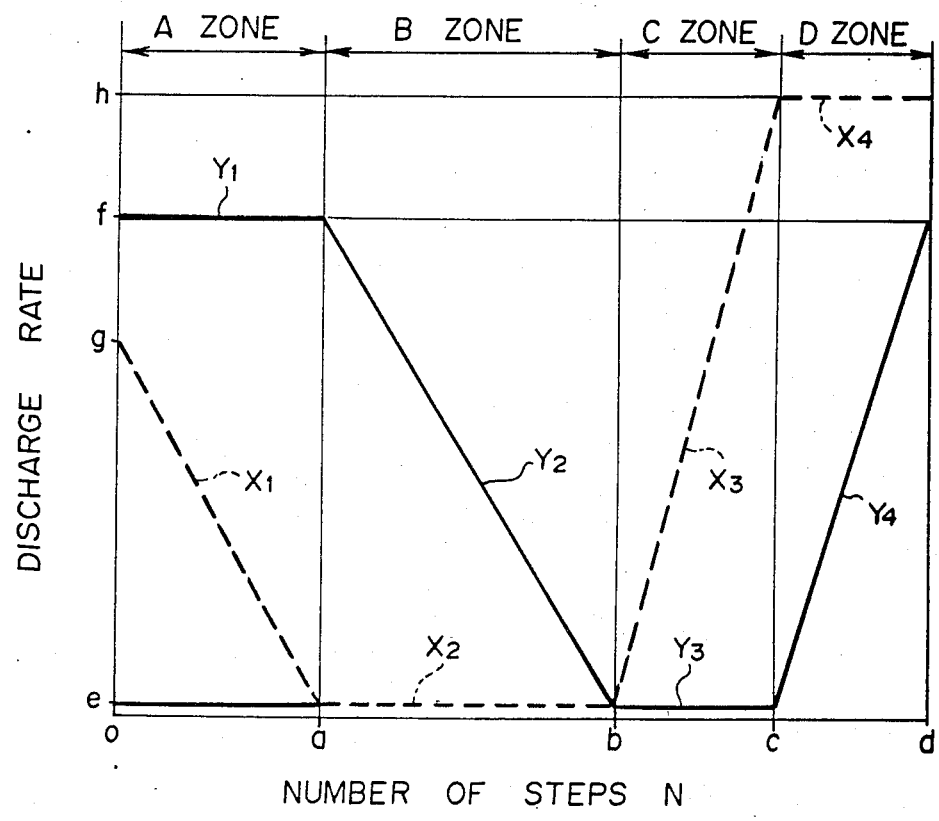
FIG. 5 is a view for illustrating the relations between the discharge rate for port lubrication and the number of steps of the stepping motor and between the discharge rate for direct lubrication and the number of steps of the stepping motor.

As shown in FIG. 6, the control unit 30 comprises a discharge rate calculating section 35 for calculating the oil discharge rate according to the intake volume (the amount of intake air introduced into the chamber 6 per one engine revolution) on the basis of the signals from the airflow meter 31 and the engine speed sensor 32, a correcting section 36 for correcting the oil discharge rate calculated by the calculating section 35 according to the output signals of the engine speed sensor 32, the oil temperature sensor 33 and the acceleration switch 34, a zone selecting section 37 for selecting one of the zones in FIG. 5 according to the discharge rate calculated by the calculating section 35 and the oil temperature, and a converting section 38 for converting the discharge rate into the number of steps of the stepping motor 28. The control unit 30 controls the metering oil pump 20 by way of the stepping motor 28 so that the oil discharge rate of the metering oil pump 20 is increased with increase in the intake volume.

Figure 7B:
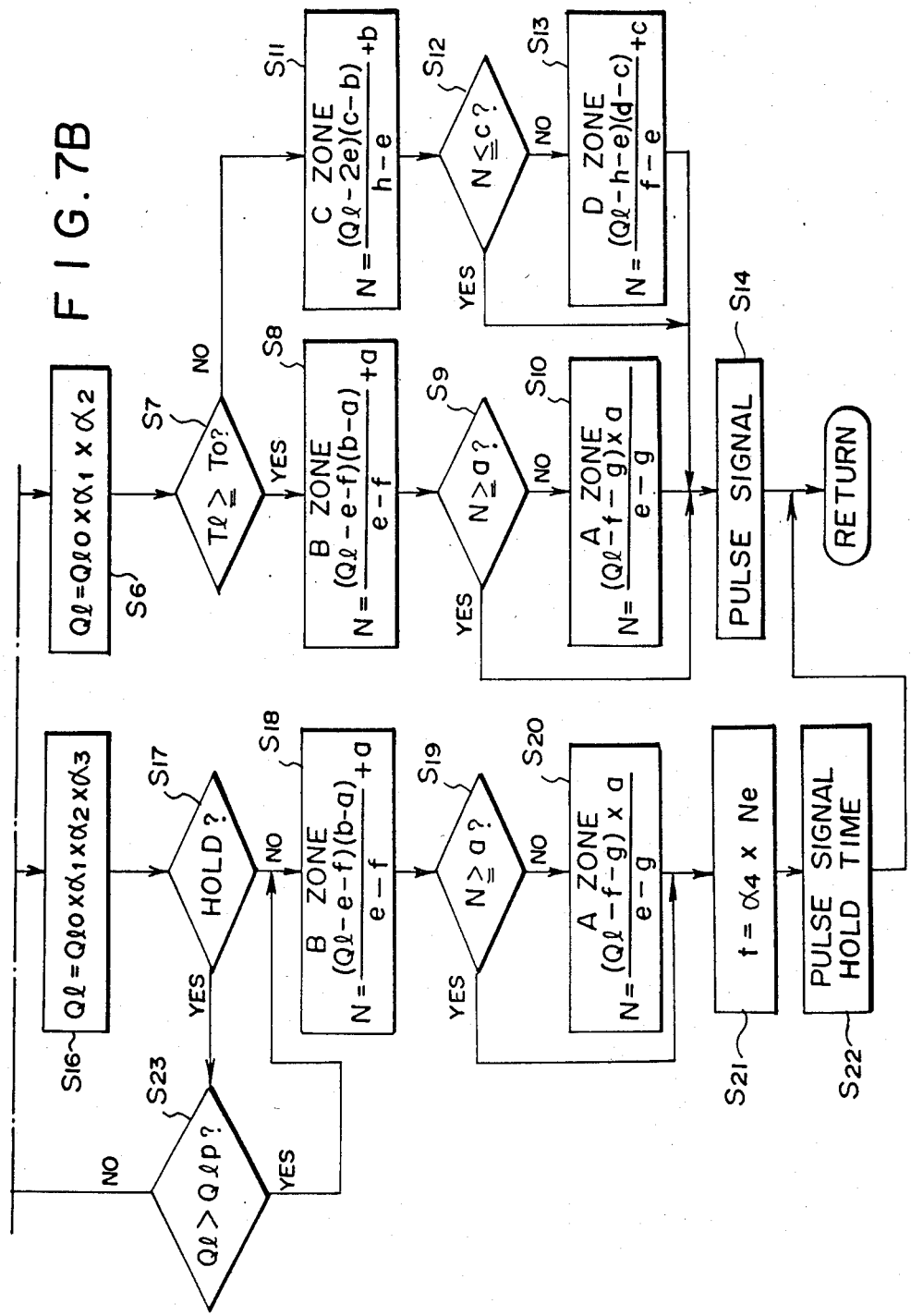

FIG. 7 is a flow chart showing an example of operation of the control unit 30. In this example, the control unit 30 controls the discharge rate of the metering oil pump 20 according to the intake volume, and at the same time, controls the ratio of the discharge rate for the port lubrication to the discharge rate for the direct lubrication according to the discharge rate, the oil temperature and the like, and performs correction taking into account acceleration of the engine and delay of change in the temperature of gas seal portions at the end of acceleration of the engine.

In step S1, the detected values of the intake volume Qa, the engine speed Ne, the oil temperature T1, and the acceleration signal (on or off) from the acceleration switch 34 are read in. In step S2, a base oil discharge rate Qlo (the amount of oil to be discharged per unit engine revolution) is calculated on the basis of the intake volume (the amount of intake air introduced into the chamber per one engine revolution) [Qlo=K x Qa/Ne, K ... constant]. Since the lubricating oil requirement also changes according to the sliding speed of the seal portions and the oil temperature, an engine speed correction coefficient $\alpha 1$ and an oil temperature correction coefficient $\alpha 2$ are calculated in step S3 as [$\alpha 1 = K1 \times Ne^2$] and [$\alpha 2 = K2 \times T1$] wherein K1 and K2 are constants. In step S4, it is determined whether the engine is being accelerated on the basis of the acceleration signal.

When it is determined than the engine is not being accelerated in the step S4, it is determined in step S5 whether acceleration hold (to be described later) continues. When it is determined that the acceleration hold does not continue in the step S5, a final oil discharge rate Q1 is calculated in step S6 by multiplying the base oil discharge rate Qlo by the engine speed correction coefficient $\alpha 1$ and the oil temperature correction coefficient $\alpha 2$. Thereafter, it is determined whether the oil temperature T1 is not lower than a predetermined value, e.g., 0° C. in step S7.

When it is determined that the oil temperature is not lower than the predetermined value in the step S7, the number of steps N of the stepping motor 28 corresponding to the final oil discharge rate Q1 is selected in the A zone or the B zone in FIG. 5 so that the oil requirement is basically satisfied by the direct lubrication and in the case that the oil requirement cannot be satisfied entirely by the direct lubrication, the port lubrication is effected to compensate for the shortage of the lubricating oil. (Steps S8 to S10) That is, it is first assumed that the number of steps N of the stepping motor 28 corresponding to the final oil discharge rate Q1 is in the B zone, and the number of steps N is calculated according to the lines $X_2$ and $Y_2$ on the basis of the following formula. (step S8)

$$N = [(Q1-e-f)(b-a)]/(e-f) + a$$

Then in step S9, it is determined whether the number of steps N thus calculated is actually in the B zone, that is, whether the number of steps N thus calculated is smaller than the first preset value a. When it is determined that the number of steps N calculated through the above formula is not in the B zone, the number of steps N is recalculated according to the lines $X_1$ and $Y_1$ on the basis of the following formula. (step S10)

$$N = (Q1-f-g) \times a/(e-g)$$

When it is determined that the oil temperature is lower than the predetermined value in the step S7, the number of steps N of the stepping motor 28 corresponding to the final oil discharge rate Q1 is selected in the C zone or the D zone in FIG. 5 so that the oil requirement is basically satisfied by the port lubrication and in the case that the oil requirement cannot be satisfied entirely by the port lubrication, the direct lubrication is effected to compensate for the shortage of the lubricating oil. (Steps S11 to S13) That is, it is first assumed that the number of steps N of the stepping motor 28 corresponding to the final oil discharge rate Q1 is in the C zone, and the number of steps N is calculated according to the lines $X_3$ and $Y_3$ on the basis of the following formula. (step S11)

$$N = [(Q1-2e)(c-b)]/(h-e) + b$$

Then in step S12, it is determined whether the number of steps N thus calculated is actually in the C zone, that is, whether the number of steps N thus calculated is smaller than the third preset value c. When it is determined that the number of steps N calculated through the above formula is not in the C zone, the number of steps N is recalculated according to the lines $X_4$ and $Y_4$ on the basis of the following formula. (step S13)

$$N = [(Q1-h-e)(d-c)]/(f-e) + c$$

Then is step S14, pulse signals corresponding to the difference between the actual number of steps of the stepping motor (i.e., the position of the stepping motor at present) and the number of steps N obtained in the manner described above, that is, the number of steps N obtained in the step S8, S10, S11 or S13 are output. Thereafter, the control unit 30 returns to the step S1.

When it is determined that the engine is being accelerated in the step S4, an acceleration correction coefficient $\alpha 3$ according to the engine speed Ne is calculated in step S15 as $[\alpha 3 = K3 \times Ne]$ wherein K3 is a constant. In step S16, an oil discharge rate Q1 during acceleration is calculated by multiplying the base oil discharge rate Qlo by the engine speed correction coefficient $\alpha 1$, the oil temperature correction coefficient $\alpha 2$ and the acceleration correction coefficient $\alpha 3$. Then in step S17 and the following steps, processing for controlling the oil discharge rate during acceleration of the engine, and processing for holding or fixing the oil discharge rate to delay control of the oil discharge rate taking into account the delay in increase in the temperature of the apex seals 7 and the like at the end of acceleration are accomplished.

That is, it is determined in step S17 whether the acceleration hold continues, or whether the oil discharge rate is being fixed to delay control of the oil discharge rate. When it is determined in the step S17 that the acceleration hold does not continue, the number of steps N corresponding to the final oil discharge rate Q1 is obtained in steps S18 to S20 in a process similar to the steps S8 to S10. Then in step S21, an acceleration hold time t is calculated by multiplying the engine speed Ne by a constant coefficient $\alpha 4$. In the next step S22, pulse signals corresponding to the difference between the actual number of steps of the stepping motor and the number of steps N obtained in the step S18 or S20 are input into the stepping motor 28 and at the same time, the acceleration hold time t is input into a timer in the control unit 30. Thereafter, the control unit 30 returns to the step S1. On the other hand, when it is determined in the step S17 that the acceleration hold continues, it is determined in step S23 whether the final discharge rate Q1 is larger than the discharge rate upon initiation of the preceding acceleration hold Qlp. When it is determined in the step S23 that the former is larger than the latter, the control unit 30 performs the steps S18 to S22, and then returns to the step S1. Accordingly, while the final oil discharge rate Q1 calculated in the step S16 during acceleration is increased with increase in the intake volume or the like, though the acceleration hold time t is set according to the engine speed Ne, the number of steps N is calculated according to the discharge rate Q1 with the hold time t being repeatedly cleared and renewed and accordingly, the acceleration hold is not actually carried out.

At the end of the acceleration, the final discharge rate Q1 becomes smaller than that upon initiation of the preceding acceleration hold, and accordingly, the control unit 30 returns to the step S1 from the step S23. Though the control unit 30 proceeds again to the step S5 by way of the steps S2 to S4, the control unit 30 repeats only the steps S1 to S5 so long as the acceleration hold continues. Accordingly, in the acceleration hold time t immediately after the end of the acceleration, the stepping motor 28 is kept in the position in which it is at the end of the acceleration, whereby the discharge rate from the metering oil pump 20 is held at the rate Q1 calculated at the end of the acceleration.

In accordance with the control described above, the amount of the lubricating oil to be discharged per unit engine revolution Q1 (discharge rate) is calculated in the control unit 30 according to the intake volume or the amount of intake introduced into the chamber 6 per one engine revolution, and the metering oil pump 20 is electrically controlled according to the calculated discharge rate Q1. The discharge rate of the metering oil pump 20 is controlled to be increased with increase in the intake volume by way of the calculation made in the step S2, thereby satisfying the lubricating oil requirement which increases as the intake volume increases and the burning pressure increases. Further, the amount of the lubricating oil to be supplied to the chamber 6 can be more precisely adjusted by correction according to the engine speed Ne, the oil temperature T1 and whether or not the engine is being accelerated.

Further, in the embodiment described above, also the ratio of the discharge rate for the port lubrication to the discharge rate for the direct lubrication is properly controlled according to the engine operating condition and the like. That is, in the case of the port lubrication, since the lubricating oil is fed into the chamber 6 mixed with intake air, the lubricating oil can be well diffused but is apt to be burnt in the chamber 6 and to be wasted. On the other hand, in the case of the direct lubrication, the lubricating oil is less apt to be wasted by combustion in the chamber 6 and can more efficiently lubricate the seal portions as compared with the port lubrication. Accordingly, during cruising when the lubricating oil is warm, the lubricating oil is mainly supplied to the chamber 6 by the direct lubrication according to the steps S8 to S10 though in the case that the oil requirement cannot be satisfied entirely by the direct lubrication, the port lubrication is effected to compensate for the shortage of the lubricating oil. On the other hand, when the temperature of the lubricating oil is low and the viscosity of the oil is high, the lubricating oil is mainly supplied by the port lubrication according to the steps S11 to S13 so that the oil is mixed with intake air in order to promote liquefaction and atomization, thereby preventing the oil from becoming greasy and lowering lubricating effect. Further, during acceleration, acceleration correction is made in the steps S15 and S16, and the lubricating oil is mainly supplied by the direct lubrication (steps S20 to S22) so that lubrication is controlled with quick response to changes in the engine operating condition.

At the end of acceleration, the temperature of the seal portions like apex seals 7 rises with a certain time delay and the temperature of the seal portions stays high for a certain time after the end of acceleration. This is the reason why the lubricating oil discharge rate is held at the rate at the end of the acceleration for the acceleration hold time t in the embodiment described above.

Though in the embodiment described above, the discharge rate for the port lubrication and the discharge rate for the direct lubrication are separately controlled by using the cams 23a and 23b of different shapes, the discharge rates can be separately controlled by other various means. For example, means for selectively inhibiting reciprocating motion of the first plunger 21a may be used or a mechanism for changing the reduction ratio of the driving worms 25a and 25b respectively for driving the plungers 21a and 21b with respect to the engine output shaft may be used. Further, the discharge rates for the port lubrication and the direct lubrication can be separately controlled by providing the oil supply passages 17 and 18 with control valves for controlling flow of the oil through the passages 17 and 18. In this case, the metering oil pump 20 may have a single plunger which discharges the lubricating oil at a fixed discharge rate. However, in the present invention, the ratio of the discharge rates need not be changed so long as the lubricating oil supply rate is electrically controlled according to the engine operating condition.

Figure 8:
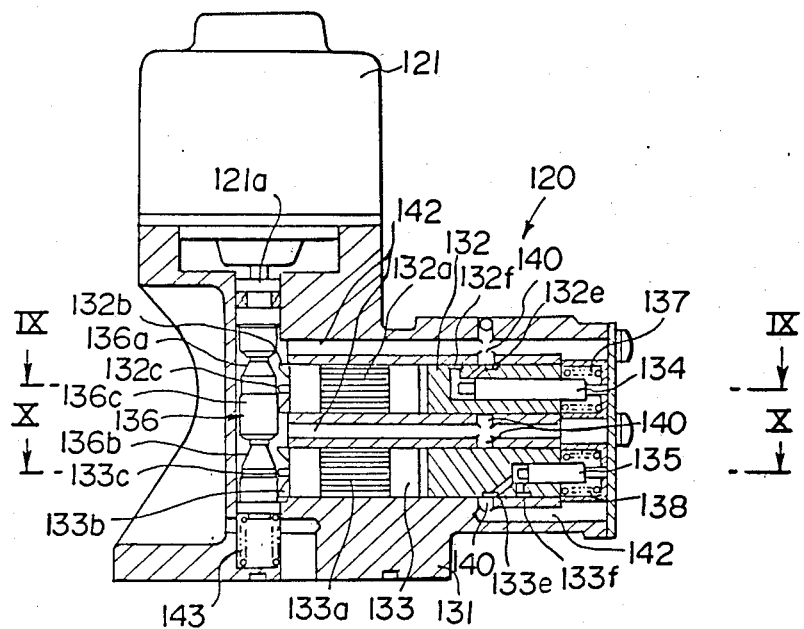
FIG. 8 is a cross-sectional view of another example of the metering oil pump which can be employed in the engine lubricating system of the present invention.
Figure 9:
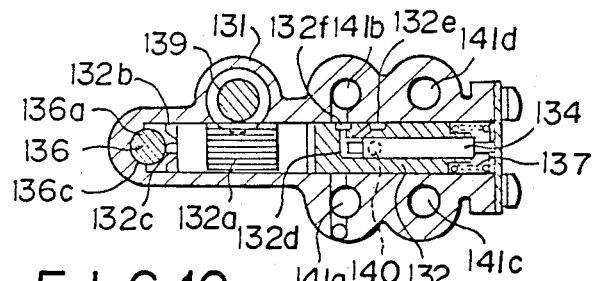
FIG. 9 is a cross-sectional view taken along line IX—IX in FIG. 8.
Figure 10:
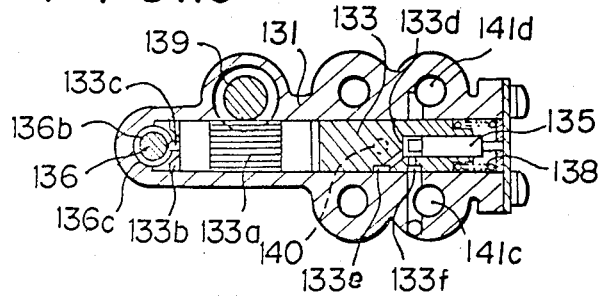
FIG. 10 is a cross-sectional view taken along line X—X in FIG. 8.

FIGS. 8 to 10 show another example of the metering oil pump which can be employed in the engine lubricating system of the present invention. In FIGS. 8 to 10, the metering oil pump 120 in this example comprises a pump housing 131 and first and second plungers 132 and 133 provided in the pump housing 131 for reciprocating motion in parallel to each other. The first plunger 132 is for the port lubrication and the second plunger 133 is for the direct lubrication. The first plunger 132 is divided into front and rear portions and a central hole is formed in the rear portion. Similarly, the second plunger 133 is divided into front and rear portions and a central hole is formed in the rear portion. A pair of pins 134 and 135 fixed to the pump housing 131 are respectively fit into the central holes of the first and second plungers 132 and 133 to form metering chambers 132d and 133d in front of the pins 134 and 135.

A control pin 136 is inserted into the pump housing 131 to extend in perpendicular to the plungers 132 and 133. The control pin 136 is provided with first and second cam surfaces 136a and 136b the cross-sectional areas of which vary in the axial direction of the control pin 136. That is, the cam surfaces 136a and 136b are axially tapered in cross section.

The plungers 132 and 133 are urged toward the control pin 136 under the force of springs 137 and 138 which are respectively disposed around the pins 134 and 135. The plungers 132 and 133 are provided with gear portions 132a and 132b in mesh with a driving worm 139 which is rotated in response to the engine output shaft. A pair of projections 132b are provided, diametrically opposed to each other, on the end face of the first plunger 132 remote from the spring 137 and a central projection 132c is provided between the projections 132b on the same end face of the first plunger 132. Similarly, a pair of projections 133b are provided, diametrically opposed to each other, on the end face of the second plunger 133 remote from the spring 138, and a central projection 133c is provided between the projections 133b on the same end face of the second plunger 133. As each plunger is rotated, the diametrically opposed projections are engaged with large diameter base portions 136c (circular in shape) of the control pin 136 and disengaged therefrom depending on the angular position thereof, and when the diametrically opposed projections are disengaged from the large diameter base portions 136c, the central projection is moved toward the control pin 136 to abut against the cam surface under the force of the spring, whereby the plunger is reciprocated. By the rotation and the reciprocating motion of the plunger 132 and 133, the lubricating oil is taken in the metering chambers 132d and 133d through inlets 140 and discharged through outlets 141a to 141d alternately in synchronization with engine revolution.

That is, the lubricating oil is introduced into the portion around the control pin 136 through the journal of the driving worm 139 and then taken into the metering chambers 132d and 133d by way of an oil passage 142 formed in parallel to the plungers 132 and 133 and the inlets 140 extending in perpendicular to the plungers 132 and 133 and opening to the oil passage 142 on opposite sides. The plungers 132 and 133 are provided with intake ports 132e and 133e adapted to be communicated with the inlets 140, and with discharge ports 132f and 133f formed axially spaced from the intake ports 132e and 133e. The outlets 141a to 141d in the pump housing 131 extend in perpendicular to the inlets 140. The outlets 141a and 141b opposed to the first plunger 132 are connected to the first oil supply passages 17 (FIG. 1), and the outlets 141c and 141d are connected to the second oil supply passages 18.

The control pin 136 is axially moved by the stepping motor 121 which is of a stroke type. The stepping motor 121 has an output shaft 121a which is coaxially disposed with the control pin 136 and is moved back and forth in the longitudinal direction thereof. The control pin 136 is urged by a return spring 143 so that an end face thereof is pressed against the output shaft 121a of the stepping motor 121. That is, the control pin 136 is moved downward (as seen in FIG. 8) to increase the oil discharge rate driven by the stepping motor 121, and is moved upward to reduce the oil discharge rate under the force of the return spring 143. The stepping motor 121 receives a pulse or pulses from the control unit 30 and moves downward the control pin 136 by a predetermined distance for each pulse.

In the metering oil pump 120, when the control pin 136 is axially moved and the diameter of the portion of each cam surface against which the central projection of the corresponding plunger abuts is changed, the stroke of the corresponding plunger is changed, thereby changing the oil discharge rate. The oil discharge rate of the metering oil pump 120 is electrically controlled by the control unit 30 by way of the stepping motor 121.

Also in this example, the discharge rate changing characteristics can be separately set for the first plunger 132 (port lubrication) and the second plunger 133 (direct lubrication) by selecting the shapes of the first and second cams 136a and 136b.

Further, as described above, the control pin 136 and the output shaft 121a of the stepping motor 121 are not mechanically connected with each other and the control pin 136 is arranged to be moved to reduce the oil discharge rate under the force of the return spring 143. If the control pin 136 should be connected to the output shaft 121a and the stepping motor 121 is forced to pull the control pin 136 upward while the intake ports 132e and 133e of the plungers 132 and 133 are not communicated with the inlets 40 in the pump housing 131 and the discharge ports 132f and 133f are not communicated with the outlets 141a to 141d, a large load would be exerted on the stepping motor 121, which would prevent the stepping motor 121 from being driven precisely according to the pulse signals and as a result adversely affect the control of the oil discharge rate. This is the reason why the control pin 136 is not mechanically connected to the output shaft 121a of the stepping motor 121.

In case that blocking of the outlets 141a to 141d and/or the oil supply passages 17 and 18 prevents supply of the lubricating oil, the lubricating oil under increased pressure will leak to the divided portions of the plungers 132 and 133 by way of the outer peripheries of the plungers 132 and 133 and push the rear portions of the plungers away from the front portions overcoming the force of the springs 137 and 138, thereby preventing transmission of rotation of the driving worm 139 to the rear portions and preventing the oil pressure from further increasing.

Further, the stroke type stepping motor is advantageous over the rotation type stepping motor in that no reduction gear is needed and the driving system can be arranged compactly, and mounting of the stepping motor is facilitated.

FIGS. 11 and 12 show still another example of the metering oil pump which can be employed in the engine lubricating system of the present invention. In FIGS. 11 and 12, the metering oil pump 245 of this example includes a single plunger 254 accommodated in a pump housing 253 to be movable back and forth. The plunger 254 has a central hole in the rear portion thereof and a pin 255 fixed to the housing 253 is received in the central hole. A control pin 247 is inserted into the pump housing 253 in perpendicular to the plunger 254. The control pin 247 has a tapered cam 256 the cross section of which changes in the axial direction of the control pin 247 and the front end of the plunger 254 abuts against the cam 256. More specifically, the cam 256 is shaped like a right cone coaxial with the control pin.

The plunger 254 is urged against the control pin 247 under the force of a spring 257 disposed around the pin 255. Further, the plunger 254 has a gear portion which is in mesh with a driving worm 258 to be rotated by the driving worm 258. When rotated by the driving worm 258, the plunger 254 is reciprocated between a position in which projections 259 on the front end thereof abut against a base portion 260 of the control pin 247 and a position in which a central projection 261 on the front end thereof abuts against the base portion 260 of the control pin 247. By the rotation and the reciprocating motion of the plunger 254, the lubricating oil is taken through upper and lower inlets 262 by way of a passage 263 and discharged through the outlets 246a and 246b by way of a passage 264 alternately in synchronization with engine revolution. The first outlets 246a are formed on the front side of the plunger 254 and the second outlets 246b are formed on the rear side of the plunger 254.

The control pin 247 is axially moved by the stepping motor 248 which is of a stroke type. The stepping motor 248 has an output shaft 248a which is coaxially disposed with the control pin 247 and is moved back and forth in the longitudinal direction thereof. The control pin 247 is urged by a return spring 265 so that an end face thereof is pressed against the output shaft 248a of the stepping motor 248. That is, the control pin 247 is moved downward (as seen in FIG. 11) to increase the oil discharge rate driven by the stepping motor 248, and is moved upward to reduce the oil discharge rate under the force of the return spring 265. The stepping motor 248 receives a pulse or pulses from the control unit 30 and moves the control pin 247 downward by a predetermined distance for each pulse.

In the metering oil pump 245, when the control pin 247 is axially moved and the diameter of the portion of the cam 256 against which the central projection 261 of the plunger 254 abuts is changed, the stroke of the plunger 254 is changed, thereby changing the oil discharge rate. The oil discharge rate of the metering oil pump 245 is electrically controlled by the control unit 30 by way of the stepping motor 248. The shape of the cam 256 is selected so that the oil discharge rate of the metering oil pump 245 is related to the number of steps of the stepping motor 248 or the number of the pulses to be input into the stepping motor 248 as shown in FIG. 13. In the cased of the meering oil pump of this embodiment, the ratio of the discharge rate for the port lubrication to that for the direct lubrication is fixed.

Figure 14:
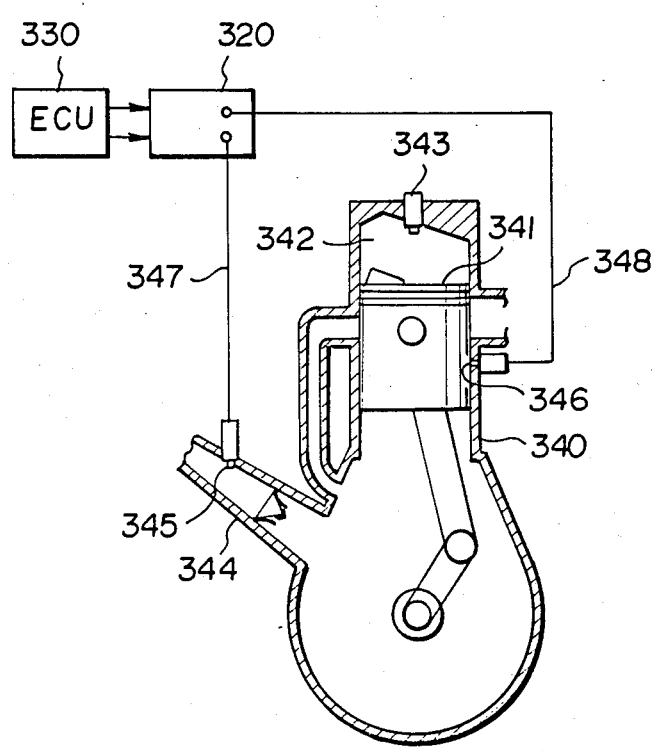
FIG. 14 is a schematic view showing another embodiment of the present invention.

Though the present invention has been described above in conjunction with a Wankel engine, the present invention can be also applied to a two-cycle reciprocating engine as shown in FIG. 14. In FIG. 14, reference numerals 340 to 344 respectively denotes a cylinder, a piston, a combustion chamber, a spark plug and an intake passage. A first oil supply port 345 opens to the intake passage 344 and a second oil supply port 346 opens to the combustion chamber 342. The first and second oil supply ports 345 and 346 are connected to a metering oil pump 320 respectively by way of a first oil supply passage 347 and a second oil supply passage 348. The metering oil pump 320 operates under the control of an electrical control unit 330.

What is claimed:

1. An engine lubricating system comprising a lubricating oil supply means having a plunger member adapted to be reciprocated in the axial direction in response to an engine output shaft to discharge lubricating oil, a control pin which is adapted to abut against the plunger member and is movable to change the stroke of the plunger member, thereby changing the amount of the lubricating oil to be discharged in each stroke of the plunger member, and an electric actuator which moves the control pin to change the stroke of the plunger member;

a control means which receives the electric signal from the operating condition detecting means and outputs an electric control signal for controlling the electric actuator;

said actuator comprising a stepping motor and said control means outputting an electric control signal representing the number of steps by which the stepping motor is to be operated;

said operating condition detecting means comprising an intake volume detecting means which detects the amount of intake air introduced into the cylinder of the engine per one engine revolution, and said control means outputs an electric signal to the stepping motor which controls the stepping motor to drive the control pin to increase the amount of the lubricating oil to be discharged in each stroke of the plunger member as the amount of intake air increases.

2. An engine lubricating system as defined in claim 1 in which said control pin is positioned on one end of the plunger member and is provided with a cam surface against which said one end of the plunger member abuts, the cam surface being a right cone coaxial with the control pin, and said stepping motor is adapted to drive the control pin in the axial direction.

3. An engine lubricating system as defined in claim 2 in which said stepping motor is positioned on one end of the control pin to push the control pin in the direction of the other end thereof, and the control pin is urged toward the stepping motor by a resilient member, said cam surface being arranged to increase the amount of the lubricating oil to be discharged in each stroke of the plunger member as the control pin is moved in the direction of said the other end thereof.

4. An engine lubricating system as defined in claim 1 in which said control pin is positioned on one end of the plunger member and is provided with a cam portion against which said one end of the plunger member abuts, the cross section of the cam portion being a circle the diameter of which varies in the axial direction of the control pin, and said stepping motor is adapted to rotate the control pin about its axis.

5. An engine lubricating system comprising a lubricating oil supply means having a plunger member adapted to be reciprocated in the axial direction in response to an engine output shaft to discharge lubricating oil, a control pin which is adapted to abut against the plunger member and is movable to change the stroke of the plunger member, thereby changing the amount of the lubricating oil to be discharged in each stroke of the plunger member, and an electric actuator which moves the control pin to change the stroke of the plunger member;

an operating condition detecting means which detects the engine operating condition by way of at least both the engine load and the engine speed and outputs an electric signal according to the engine operating condition; and a control means which receives the electric signal from the operating condition detecting means and outputs and electric control signal for controlling the electric actuator;

said control pin being positioned on one end of the plunger member and being provided with a cam surface against which said one end of the plunger member abuts, the cam surface being a right cone coaxial with the control pin, and said actuator being adapted to drive the control pin in the axial direction.

6. An engine lubricating system comprising a lubricating oil supply means having a plunger member adapted to be reciprocated in the axial direction in response to an engine output shaft to discharge lubricating oil, a control pin which is adapted to abut against the plunger member and is movable to change the stroke of the plunger member, thereby changing the amount of the lubricating oil to be discharged in each stroke of the plunger member, and an electric actuator which moves the control pin to change the stroke of the plunger member;

a control means which receives the electric signal from the operating condition detecting means and outputs an electric control signal for controlling the electric actuator;

said operating condition detecting means comprising an intake volume detecting means which detects the amount of intake air introduced into the cylinder of the engine per one engine revolution.

7. An engine lubricating system comprising a lubricating oil supply means having a plunger member adapted to be reciprocated in the axial direction in response to an engine output shaft to discharge lubricating oil, a control pin which is adapted to abut against the plunger member and is movable to change the stroke of the plunger member, thereby changing the amount of the lubricating oil to be discharged in each stroke of the plunger member, and an electric actuator which moves the control pin to change the stroke of the plunger member;

an operating condition detecting means which detects the engine operating condition by way of at least both the engine load and the engine speed and outputs an electric signal according to the engine operating condition; and a control means which receives the electric signal from the operating condition detecting means and outputs an electric control signal for controlling the electric actuator;

said lubricating oil supply means comprising a first plunger member which is adapted to discharge the lubricating oil through a first discharge port connected to the combustion chamber of the engine by way of the intake passage of the engine and a second plunger member which is adapted to discharge the lubricating oil through a second discharge port directly connected to the combustion chamber, said control pin being provided with first and second cam surfaces which are adapted to respectively abut against the first and second plunger members and which differ from each other in shape.

8. An engine lubricating system as defined in claim 7 in which the second cam surface is arranged with respect to the first cam surface so that the amount of the lubricating oil to be discharged from the second discharge port by the second plunger member becomes larger than the amount of the lubricating oil to be discharged from the first discharge port by the first plunger member at least when the engine load is heavier than a predetermined value and the engine speed is higher than a predetermined value.

9. An engine lubricating system as defined in claim 7 in which said control means is arranged to receive an output signal of an engine temperature detecting means and to output the electric control signal to separately control the actuator according to whether the engine temperature is higher than a predetermined value, and said first and second cam surfaces are arranged with respect to each other so that the amount of the lubricating oil to be discharged from the second discharge port by the second plunger member becomes larger than the amount of the lubricating oil to be discharged from the first discharge port by the first plunger member when the engine temperature is higher than the predetermined value and otherwise the latter becomes larger than the former.

10. An engine lubricating system comprising a lubricating oil supply means having a plunger member adapted to be reciprocated in the axial direction in response to an engine output shaft to discharge lubricating oil, a control pin which is adapted to abut against the plunger member and is movable to change the stroke of the plunger member, thereby changing the amount of the lubricating oil to be discharged in each stroke of the plunger member, and an electric actuator which moves the control pin to change the stroke of the plunger member; an operating condition detecting means which detects the engine operating condition by way of at least both the engine load and the engine speed and outputs an electric signal according to the engine operating condition; and a control means which receives the electric signal from the operating condition detecting means and outputs an electric control signal for controlling the electric actuator, in which said control pin is provided with a pair of circular base portions and a cam portion the shape of which is a cone coaxial with the control pin and which is formed between the circular base portions, said plunger member is cylindrical in shape, and is provided, on a part of the outer peripheral surface, with a gear portion to which rotation of the engine output shaft is mechanically transmitted, and on one end face, with a pair of diametrically opposed projections and a central projection, the diametrically opposed projections being adapted to abut against the circular base portions of the control pin and the central projection being adapted to abut against the cam portion of the control pin as the plunger is rotated, thereby causing the plunger to reciprocate while being rotated between a position in which the diametrically opposed projections abut against the circular base portions and a position in which the central projection abuts against the cam portion, said actuator comprises a stepping motor having an output shaft which is driven in the axial direction thereof, the plunger member is received for rotation and sliding movement in a plunger receiving hole formed in a housing, the control pin is received for rotation and sliding movement in a control pin receiving hole formed in the housing to extend in perpendicular to the plunger receiving hole, an oil chamber being defined by the plunger in the plunger receiving hole and an oil intake port and an oil discharge port being formed in the housing to be alternately communicated with the oil chamber as the plunger is rotated, the stepping motor is supported on the housing with the output shaft being in alignment with the control pin and the free end face of the output shaft resting on the end face of the control pin toward which the thinner portion of the conical cam portion is directed, and the control pin is urged toward the free end face of the output shaft of the control pin under the force of a spring.

11. An engine lubricating system comprising a lubricating oil supply means having a plunger member adapted to be reciprocated in the axial direction in response to an engine output shaft to discharge lubricating oil, a control pin which is adapted to abut against the plunger member and is movable to change the stroke of the plunger member, thereby changing the amount of the lubricating oil to be discharged in each stroke of the plunger member, and an electric actuator which moves the control pin to change the stroke of the plunger member; an operating condition detecting means which detects the engine operating condition by way of at least both the engine load and the engine speed and outputs an electric signal according to the engine operating condition; and a control means which receives the electric signal from the operating condition detecting means and outputs an electric control signal for controlling the electric actuator, in which said control pin is provided with a pair of circular base portions and a cam portion which has a cam surface on the outer peripheral surface thereof and which is formed between the circular base portions, the cam surface being arranged so that the distance from the axis of the control pin varies in the peripheral direction, said plunger member is cylindrical in shape, and is provided, on a part of the outer peripheral surface, with a gear portion to which rotation of the engine output shaft is mechanically transmitted, and on one end face, with a pair of diametrically opposed projections and a central projection, the diametrically opposed projections being adapted to abut against the circular base portions of the control pin and the central projection being adapted to abut against the cam surface of the control pin as the plunger is rotated, thereby causing the plunger to reciprocate while being rotated between a position in which the diametrically opposed projections abut against the circular base portions and a position in which the central projection abuts against the cam surface, said actuator comprises a stepping motor having a rotating output shaft, the plunger member is received for rotation and sliding movement in a plunger receiving hole formed in a housing, the control pin is received for rotation in a control pin receiving hole formed in the housing to extend in perpendicular to the plunger receiving hole, an oil chamber being defined by the plunger in the plunger receiving hole and an oil intake port and an oil discharge port being formed in the housing to be alternately communicated with the oil chamber as the plunger is rotated, the stepping motor is supported on the housing with the output shaft being operatively connected to the control pin to rotate the cam surface under the control of the control means.

* * * * *

UNITED STATES PATENT AND TRADEMARK OFFICE
CERTIFICATE OF CORRECTION

PATENT NO. : 4,774,918
DATED : October 4, 1988
INVENTOR(S) : Noriyuki Kurio; Hiroshi Yoshimi; Takuro Shigemura; and Yuuji Shono It is certified that error appears in the above-identified patent and that said Letters Patent is hereby corrected as shown below:

On the title page, item 30, after "61-14098", --Sep. 24, 1986 [JP] Japan..........61-225683-- should be inserted.

Signed and Sealed this

Seventeenth Day of October, 1989

Attest:

DONALD J. QUIGG

Attesting Officer

Commissioner of Patents and Trademarks